Patented Mar. 25, 1947

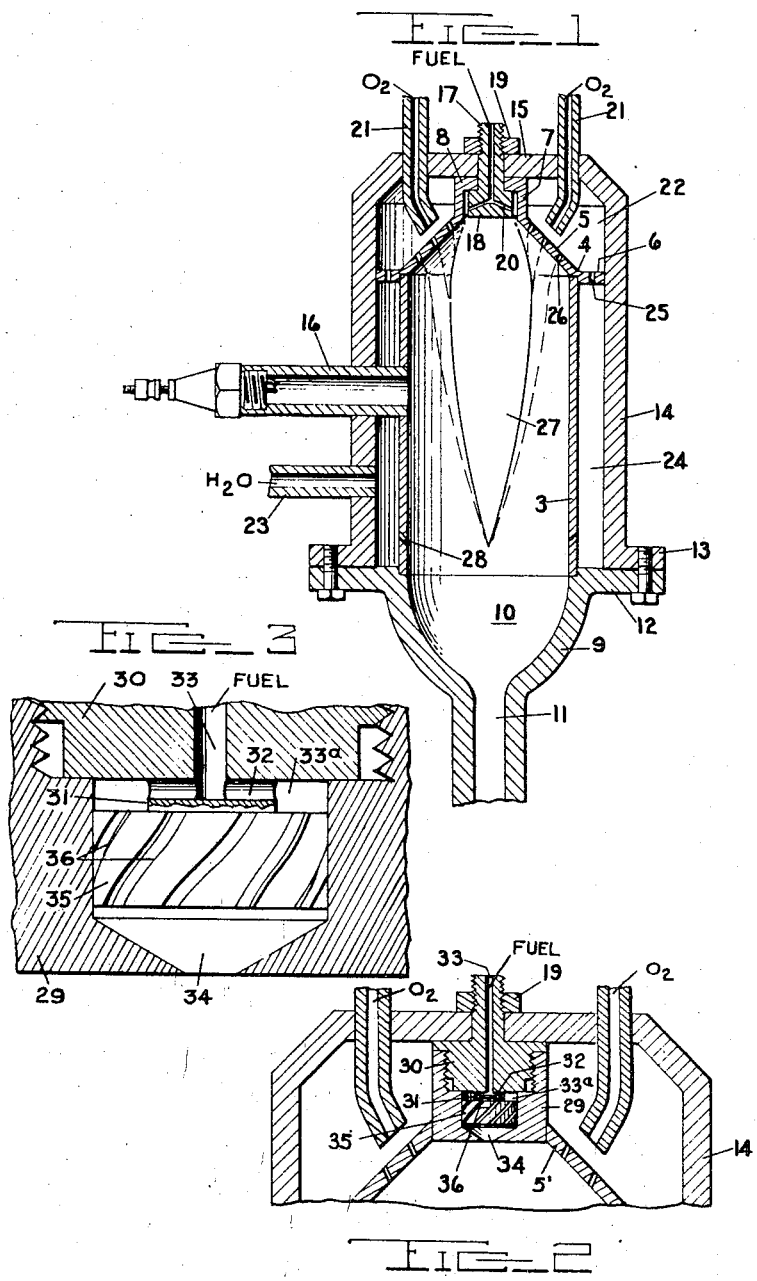

2,417,835

UNITED STATES PATENT OFFICE 2,417,835

COMBUSTION DEVICE

Harry H. Moore, Washington, D. C.

Application September 25, 1936, Serial No. 102,545

2 Claims. (Cl. 60—45)

(Granted under the act of March 3, 1883, as amended April 30, 1928; 370 O. G. 757)

This invention relates to a combustion device of the type used in naval torpedoes and has among its several objects to provide a device of the kind specified, adapted for burning fuel in an atmosphere of substantially pure oxygen and includes provisions for preventing destructive heating and oxidation of the wall of the combustion chamber.

In the drawing:

Fig. 1 is a longitudinal axial section of one embodiment of the present invention;

Fig. 2 is a fragmentary detail section illustrating a type of fuel nozzle different from the one illustrated in Fig. 1; and Fig. 3 is an enlarged sectional detail view of a portion of Fig. 2.

The power plant of modern torpedoes includes means for introducing compressed air into the combustion chamber, or combustion pot. The use of compressed air increases the rapidity of combustion and power is obtained both because of the augmented volume of the working gases and of the higher temperature thereof. Further to increase this power and to prevent the temperature of the products of combustion reaching a point at which they are destructive to the combustion chamber and the turbine or other prime mover, it is customary to introduce water into the zone of combustion. The evaporation of the water not only absorbs heat but the steam thus formed adds to the volume of working gases.

It has heretofore been suggested that additional power might be derived from such combustion devices if compressed oxygen were used instead of compressed air. However, owing to the exceedingly high temperatures thus developed, a practicable means of supporting combustion with oxygen in apparatus of this sort has not been previously devised. The present invention affords a solution of the difficulty mentioned.

In Fig. 1 the immediate wall of the combustion chamber is formed of a cylindrical member 3 preferably made of an alloy of chromium which is resistant to both oxidation and high temperature. Seated against one end of the member 3 is a cap member 4 having a frusto-conical portion 5, radially outwardly extending flange 6 and an axially extending cylindrical portion 7 whereof the outer end is substantially closed as indicated at 8. The outer end of member 3 is seated in a rabbet in base 9 which is, adjacent sleeve 3, of substantially the same diameter as the inner diameter of the sleeve and forms a substantially globular chamber 10 that merges into a restricted outlet 11. Radially extending flange 12 of base 9 has clamped against it the flange 13 on outer member 14 which surrounds and encloses the members 3 and 4. Member 14, which is preferably of metal having a relatively low heat conductivity, is of such internal diameter as to form a close fit with the flange 6 and is of such length that its closed end 15 seats against the closed end 8 of cylindrical portion 7.

The tube 16 affords access to the combustion chamber for the insertion of an igniting element such as the well known spark plug or igniting piston. Fuel is introduced into the combustion chamber through the nozzle 17 which has a shank that extends through closed end 8 of cylindrical portion 7 and closed end 15 of the member 14 and a head 18 seated in cylindrical portion 7. A nut 19 on said shank clamps the closed ends 8 and 15 together. The diameter of head 18 is such that an annular space is formed between the head and cylindrical portion 7 and thus the cylindrical portion constitutes a guard ring to direct into the combustion chamber the fluid issuing from the radially extending ducts 20 in head 18.

Any desired number of jets 21 may be provided for introducing oxygen into the mixing chamber 22 defined by the closed end of member 14 and the cap member 4. It is to be observed that the inner ends of jets 21 are so bent as to direct the streams of oxygen issuing therefrom normally against the frusto-conical portion 5. Pipe 23 discharges into the space 24 between member 3 and member 14 and is connected at the other end to a source of water under pressure. The perforations 25 in flange 6 are of such diameter that water in the space 24 passes through them in the form of a stream of droplets into mixing chamber 22 where it commingles with the turbulently moving oxygen that has issued from jets 21 against the portion 5. Perforations 26 through frusto-conical portion 5 are so disposed that the streams of commingled oxygen and water droplets passing therethrough converge toward the burning fuel, indicated by a flame 27, and form an envelope around the flame. This insures that all the fuel will come in contact with oxygen to support the combustion thereof and provides a screen of water between the flame and the combustion chamber wall 3. The heat absorbed in evaporating this water screen is prevented from reaching the member 3 and hence the temperature to which that member is subjected is much lower than the temperature of combustion. The perforations 28 through member 3 adjacent the tip of flame 27 introduce streams of water droplets into the combustion chamber in addition to the water carried in by the oxygen.

In Fig. 2 a different type of fuel nozzle is illustrated. The cylindrical member 29 is fitted into the smaller end of frusto-conical portion 5' and is held in firm contact with closed end 15 of outer member 14 by nut 19 engaged with the shank of a member 30 that is screwed into the member 29. On the inner end of the member 30 is a boss 31 (shown in section) in which are formed ducts 32 through which fuel passes from bore 33. Inwardly of the member 30 there is formed in member 29 a cavity having a cylindrical portion 33a and a frusto-conical portion 34 that opens at its smaller end into the combustion chamber. Fitted into cylindrical portion 33a is a cylindrical member 35 having helical grooves 36 in its peripheral surface. The fuel issuing from ducts 32 passes through the grooves 36 and is thereby given a vortical movement which causes the fuel to have a vigorous turbulent motion when it passes into the combustion chamber and thereby aid in the mixture of the fuel with the oxygen.

The herein described invention may be manufactured and used by or for the Government of the United States of America for governmental purposes without the payment of any royalties thereon or therefor.

What is claimed is:

1. A combustion device, comprising a base member having in it a substantially globular cavity merging into a constricted outlet, an outer member of low thermal conductivity metal having a closed end and an open end secured to said base; a spray head having a cup-shaped portion seated against said closed end, a frusto-conical portion connected at its small end to said cup-shaped portion, and a radially outwardly extending plane flange at the base of said frusto-conical portion fitting against the inner surface of said outer member, the said flange and said frusto-conical portion being finely perforated; a fuel supply device extending through said outer member into said cup-shaped portion, an inner hollow cylindrical member of metal resistant to oxidation seated on said base to coincide with said cavity and seated against said spray head at the juncture of said frusto-conical portion and said flange, said inner member having fine perforations through its wall adjacent said base directed inwardly toward said base, means to introduce a plurality of streams of combustion supporting fluid through the closed end of said outer member, means to introduce water into the space between said inner and said outer members, and means to give access to said inner member to ignite a fuel mixture therein.

2. A combustion device, comprising a base member having in it a substantially globular cavity merging into a constricted outlet, an outer member of low thermal conductivity metal having a closed end and an open end secured to said base; an element cooperating with said closed end to define a mixing chamber in said outer member, said element having a perforated radially extending flange fitting against the inner surface of said outer member and a perforated inclined portion, an inner cylindrical member spaced from said outer member and seated at one end against said base and at the other end against the juncture of said flange with said inclined portion, said inner member having perforations through its wall adjacent said base inclined inwardly toward said base, means to introduce fuel through said element into said inner member, means to direct a plurality of streams of a fluid supporter of combustion against said inclined portion normally thereto, and means to force a spray of water into said inner member through the perforations therein and into said mixing chamber through the perforations in the flange of said element.

HARRY H. MOORE.

REFERENCES CITED

The following references are of record in the file of this patent:

UNITED STATES PATENTS

| Number | Name | Date |
|---|---|---|
| 1,459,482 | Underwood | June 19, 1923 |
| 1,241,781 | Taylor | Oct. 2, 1917 |
| 1,531,475 | Brandt | Mar. 31, 1925 |
| 2,168,313 | Bichowsky | Aug. 8, 1939 |

FOREIGN PATENTS

| Number | Country | Date |
|---|---|---|
| 7,390 | British | Mar. 27, 1907 |
| 148,341 | British | Oct. 10, 1921 |
| 492,294 | French | Jan. 11, 1916 |
| 343,923 | British | Feb. 25, 1931 |